Patented Sept. 26, 1939

2,173,878

UNITED STATES PATENT OFFICE 2,173,878

MANUFACTURE OF GUM CONFECTIONS

Arthur D. Fuller, New York, N. Y., assignor to National Adhesives Corporation, New York, N. Y., a corporation of Delaware No Drawing. Application November 21, 1936, Serial No. 112,140

4 Claims. (Cl. 99—134)

This invention relates to the manufacture of gum confections, and more particularly to the manufacture of a gum confection containing a chlorinated starch reaction product.

The making of chlorinated starch reaction products of generic types dealt with herein are described by me in my prior Patents No. 1,942,544, issued January 9, 1934, and No. 2,014,798, issued September 17, 1935. The prime object of the present invention centers about the making of gum confections referred to in the art as "gum work", "gum jelly work", "A. B. gums" (common soft gum drops), "hard gums" and by other names, and which consist of a composition of sugars and a chlorinated starch reaction product.

These gum confections consist of a composition of sugars and starches, various types of which are used such as sucrose, glucose, dextrose, maltose, levulose and thin or thick cooking starches. The purpose of the starch is to impart to the confection a "body" or "firm jelly structure" and produce a product having chewing properties, that is, properties rendering necessary mastication for a period of time before swallowing. I have discovered that chlorinated starch products have distinctive advantages over all other starches employed in the manufacture of gum confections. I have further found that when starches are chlorinated in accordance with the process described in my aforesaid Patents No. 1,942,544 and No. 2,014,798 and where the process is regulated to produce a chlorinated starch reaction product having a fluidity (as measured on the Corn Products Refining Company fluidity scale) of 30 to 85 inclusive, with approximately 60 the preferred range, that gum confections composed of sugars and this chlorinated starch reaction product have new and improved important characteristics which are substantially as follows:

(a) The shelf life of the gum confections made with the chlorinated starch reaction product is greatly increased due to the ability of the confection to keep tender. This is found to be due to the elastic condition of a chlorinated starch film and to the stability of chlorinated starch in the presence of the sugar employed in gum confections. Chlorinated starch films do not shrink as much as do other starch films; they are more homogeneous and have less tendency to crack than the films of acid treated or thick cooking starches. Minimizing the shrinkage of the confection is highly desirable not only because the appearance of the confection is thereby improved, but because shrinkage causes the confection to become tough and difficult to masticate. The improved stabilizing or dispersing effect of sugar on chlorinated starch (when compared with fluidity starch made by treating thick cooking starch with an acid) causes the resulting confection to undergo less change in hardening on aging. Therefore gum confections made in accordance with the principles of the present invention are not as susceptible to the influences of time and changing temperature conditions as are confections made with the starches heretofore employed. This superior aging quality causes the brilliance of the confection to be maintained over a long period of time, and adds to its shelf life as well as to its sales appeal.

(b) The gum confections made with the chlorinated starch reaction product have a markedly greater jelling characteristic when compared with confections made with an acid-treated thin boiling starch of like fluidity (measured at 80° C.). This permits the confection to hold its shape better, in hot or humid weather, and gives the candy more resiliency and chewability.

(c) The gum confections made with the chlorinated starch reaction product are more transparent and brilliant than those made with thick-cooking starches made fluid by treatment with acids or heat, or both. The appearance of the candy is more attractive due to the fact that the candies produced are more transparent. Moreover, when these candies are broken their fine appearance is maintained due to better light refraction.

(d) By chlorinating the starch the characteristic taste and odor of the starch is either reduced or entirely eliminated; and thus the confection made therewith has a decidedly better flavor than those made with thick-cooking or acid-treated starches. The chlorinating and purification treatment which the starch undergoes tends to remove all characteristic odor and taste which the starch may have. Starch has associated therewith certain quantities of fats, oils and nitrogenous substances which seem to impart a characteristic odor and taste to certain varities, of which potato starch is the most outstanding. Since starches used in foods and candies should not impart any taste thereto but on the contrary should be as bland as possible (since flavoring, coloring and sweetening compounds are employed therewith), it is highly desirable that the starch product used interfere as little as possible with the functions of the flavoring, coloring and sweetening compounds employed. This is accomplished with the product of my present invention.

(e) Gum confections made in accordance with the present invention can be cast into the molds at a lower moisture content. This is possible due to the fact that the chlorinated starch, although producing a stiffer jell when cold, is thinner flowing when hot. This unusual characteristic also makes it possible for the casting to take place without the formation of tailings when using chlorinated starch, since the hot jelly breaks short and clean between molds. Since acid-treated starch, as stated above, is not as thin flowing as the chlorinated starch when hot, it would not be possible to cast the hot jelly at as low a moisture content when the acid-treated starch is employed, as when chlorinated starch is used.

(f) Because of the fact that gum candies made with chlorinated starch solidify more rapidly than when other starches are used, and because of the low moisture content when cast, the confections can be removed from the mold in a shorter period of time, with resulting increase in production and decrease in cost.

(g) Because of the greater jelling tendency of the gum candies made from chlorinated starch, it is not only practicable, but actually necessary to use approximately 10% to 15% less of the chlorinated starch, compared to a like fluidity of acid-treated thin boiling starch. The yield of the batch however, is not diminished, since the chlorinated starch possesses the ability to maintain a greater percentage of water in the finished batch, and at the same time have all of the other characteristics that are desirable. I have found that the finished batch, where chlorinated starch is used, will contain approximately 1% to 1½% more water than when made with acid-treated starches, and that the gum candies do not give up this excess moisture under ordinary conditions, and certainly to no greater extent than like formulas employing acid-treated starches.

As set forth in my aforementioned prior Patents No. 1,942,544 and No. 2,014,798, to make a chlorinated starch reaction product in accordance with my invention therein described, the starch material, preferably in milk form, is first treated with a hypochlorite of an alkali earth metal (e. g. calcium, sodium, potassium or magnesium hypochlorite), or with an equivalent chlorine containing body, preferably in an alkaline medium. The hypochlorite is introduced into the starch milk preferably a little at a time over a considerable period of time and the magma is kept in agitation, preferably, until the available chlorine is completely absorbed, that is, until the chlorine in any form capable of reacting with the starch is all taken up by the starch. After chlorination is completed, the pH value of the starch milk is adjusted to the point on the pH scale proper for the particular product which is to be manufactured. The resulting product is then screened (particularly where Sago flour is being treated), filtered (and preferably washed), and then dried. These chlorinated starch reaction products may be made from different starches such as Sago, tapioca, potato, cassava and corn starch.

In accordance with the principles of the present invention, the process of making the chlorinated starch reaction product is so controlled that there is produced a reaction product having the characteristics in the candy confection composition set forth above. I have found that the desired results are achieved when the process is controlled so as to produce a starch reaction product having a fluidity from 30 to 85, and that the best results are to be obtained when the fluidity of the chlorinated starch product is in the range between 55 to 65. When the fluidity is too low, the confection is too viscous to flow through the nozzles of the casting or depositing machine, unless boiled for a prolonged period of time, which is undesirable. When the fluidity is too high, the confection does not have sufficient "body", and tends to produce an undesirable "sweating", that is particularly noticeable in warm weather. The desired range of fluidity is accomplished by controlling, in the manner described in the various examples hereinafter set forth, the steps of chlorination and adjustment of pH values of the starch reaction product.

The following are a number of examples showing the manufacture from different starches of the starch reaction products preferably employed in the manufacture of the gum confection of the present invention, these examples being explanatory of the manner of controlling the process and testing for starch reaction products having fluidity in the range between 55 to 65.

*Example I—Sago starch reaction product*

35,000 lbs. of P. S. or turtle sago is dumped into a tank containing about 40,000 lbs. of water and a starch milk is produced. The temperature of the starch milk is preferably about 60° F.

The hypochlorite solution, such as sodium hypochlorite, containing as an excess of alkali 4.5 to 6% chlorine and containing an added amount of free caustic soda, equivalent to 35% to 37% of the free available chlorine, is added in small portions over a period of time such as three hours. Enough is added to give 0.75% available chlorine on the starch. After the addition has been completed and the milk allowed to agitate until the chlorine has been more or less completely absorbed, the starch is tested for fluidity, as more fully set forth below and more briefly as follows: A sample of the starch is washed and filtered, then brought to a concentration of 8° on the Brix scale. 100 cc. of this milk is cooked for one hour, brought back to weight and run on the Stormer viscosimeter. In case this test shows a fluidity of less than that desired, such as 55, a small amount of additional hypochlorite is added and the milk is again agitated. In any event, the agitation is continued sufficiently long until the free chlorine is essentially completely absorbed. Any residual available chlorine is removed with one of the ordinary antichlors. The pH value is brought to 4.0 to 4.5, by adding muriatic acid. The starch milk is then screened and then filtered, the filtering being carried out sufficiently to subsequently remove soluble materials. The product is then dried in the customary manner and brought to a normal commercial moisture content. The pH of the finished material is preferably between 6.0 to 6.5, although it may be lower or higher, if desired.

*Example II—Potato starch reaction product*

The following is a small batch example employing potato starch:

500 gms. of imported potato starch are suspended in 550 cc. of water, and treated with 0.9% of available chlorine as sodium hypochlorite containing as an excess of alkali 150% of NaOH on the chlorine. The hypochlorite is added slowly over ten hours. A sample of the starch product is run through a fluidity test. Several hours after the last of the hypochlorite is put in, the excess chlorine is taken up with an antichlor, the pH adjusted to 7.0, and the starch filtered.

The filter cake is broken up and agitated with fresh tap water for two hours, the pH adjusted to 7, and the starch filtered off and air dried at room temperature. This starch has a fluidity of 60 when cooked for one hour according to the regular test procedure described hereinbelow.

This procedure is followed with a small batch example. In carrying out the process with a larger batch slightly more hypochlorite is used; for example, 0.95% instead of 0.9% available chlorine may be used.

*Example III—Corn starch reaction product*

The following is a small batch example employing corn starch.

1000 gms. of commercial corn starch are suspended in 1150 cc. of water, and treated with 1.5% of available chlorine as sodium hypochlorite containing an excess of alkali such as 100% NaOH on the chlorine. The hypochlorite is added slowely over a period of nine hours. A sample of the starch product is run through a fluidity test. Several hours after the last hypochlorite is put in, the excess chlorine is taken up with an antichlor, the pH adjusted to 5.0, and the starch filtered off. The filter cake is broken up and agitated with fresh tap water for two hours, the pH adjusted to 5.0, and the starch filtered off and air dried at room temperature. The starch reaction product prepared in this manner has a fluidity about 60 when cooked for one hour according to the regular test procedure described hereinbelow.

*Method for testing 60 fluidity chlorinated starches*

Sample.—A ten gram sample is used for the test; this is mixed with 100 grams distilled water in a porcelain beaker. Weights are taken since the sample is brought back to weight after cooking.

Cooking.—The sample, thus prepared, is placed in a vigorous boiling water bath which is maintained at 100° C. for exactly one hour. Timing is started when the sample is placed in the bath; the sample is stirred until a temperature of 90° C. is constant throughout the jelled starch. The beaker is covered with a rubber stopper in which has been bored a hole for the thermometer. When the one hour is up, the sample is removed from the water bath and brought back to weight.

Measuring viscosity.—The bath on the viscosimeter is maintained at 80–82° C. and the sample is cooked to 80° C. Immediately after bringing back to weight, the sample is poured into the beaker up to the level of the two baffles on the inside of the beaker. The ring is then raised and the lamp put under so the temperature in the bath is raised to 80° C. The thermometer is inserted in the "well" and the temperature is held at 80° C.

With the revolution indicator at −15 to 20, the brake is released and the weight is allowed to fall. Timing with a stop watch is started when the indicator shows zero and stopped when 100 revolutions have elapsed. The time per 100 revolutions is recorded. During this time the temperature of the starch solution is maintained at 80° C., plus or minus 1° C.

Three such readings are taken. Any skin which collects on the surface of the starch should be removed with a rod. A 60 fluidity starch should allow the cylinder to revolve 100 times in 15.6 seconds. The desired manufacturing limits are 15.4 seconds, equivalent to a 61 fluidity, and 15.9 seconds, equivalent to a 59 fluidity.

When tapioca starch is used, substantially the same procedure as set forth above for sago starch is employed. It is to be observed that tapioca starch does not filter quite as well and also requires a larger amount of chlorine to produce a given end point than is necessary to use for a corresponding grade made out of sago starch. Tapioca is characterized by much smaller granules than sago starch, and for that reason, cannot be dewatered as readily on the vacuum type suction filter.

Other starches, such as wheat, arrowroot and rice, may also be employed in the chlorination process. To secure confections having a high degree of brilliancy and film elasticity, it is preferred to use potato, sago, tapioca or corn starch; with potato starch the brilliancy is so superior that natural gums may be replaced thereby. While the examples given are for the manufacture of a chlorinated product having a fluidity in the range of 60 as described, it will be understood that while this is the preferred range to obtain all of the advantages set forth, I do not limit myself to this fluidity range in the broader aspects of the invention.

In manufacturing the gum confection, the chlorinated starch is compounded with sugars and is processed in accordance with the typical examples given hereinbelow. These examples show the approximate content of the starch reaction product which may vary according to the practice of the manufacturer or the product desired. The process of manufacture may also be varied, it, however, being common practice to heat the sugars with some water at a temperature of about 212° F. and while at this temperature, to inject into the batch a mixture of starch with cold water. It is also the practice to incorporate the starch with water and the sugars preliminary to heating although better dispersion is obtained when the starch product is added (cold) to the hot sugar solution. The following are examples typical of the manufacture of the confection.

*"A. B. gums"*

37 lbs. of cane sugar, 10 lbs. nulomoline and 31 lbs. corn syrup (43° Baumé) dissolved in six gallons of water are brought to a boil. To this is then added 10¼ lbs. of a thin boiling chlorinated starch reaction product, such as the 60 fluidity chlorinated starch described above, four gallons of water and 1 oz. of cream of tartar. The cooking is then finished, the steam shut off and 22 lbs. of corn syrup added. This is then well stirred, colored and flavored.

*"Cerelose gum"*

35 lbs. of corn syrup (43° Baumé), 10 lbs. nulomoline, 20 lbs. cerelose and 10 lbs. cane sugar dissolved in six gallons of water are brought to a boil. To this is added 10 lbs. of a thin boiling chlorinated starch reaction product, such as the 60 fluidity chlorinated starch described above, four gallons of water and 1 oz. of cream of tartar. The cooking is then finished, the steam shut off and 25 lbs. of corn syrup is added. This is then mixed well, colored and flavored.

*"Better grade gum"*

40 lbs. of cane sugar and 30 lbs. of corn syrup (43° Baumé) dissolved in six gallons of water are brought to a boil. To this is then added 10¼ lbs. of a thin boiling chlorinated starch reaction product such as the 60 fluidity chlorinated starch described above, four gallons of water and 1 oz. of cream of tartar. The cooking is then finished, the steam shut off and 22 lbs. of corn syrup and 10 lbs. of cane sugar are added raw. This is then mixed well, flavored and colored.

"Hard gums"

40 lbs. of cane sugar and 60 lbs. of corn syrup (43° Baumé) dissolved in 6 gallons of water are brought to a boil. To this is added while boiling 12½ lbs. of chlorinated starch reaction product such as the 60 fluidity chlorinated starch described above mixed with 6 gallons of cold water. This is cooked to a good "string", the steam shut off, and then flavored and colored.

The process of manufacturing the improved gum confection of the present invention and the preferred chlorinated starch reaction products therefor and the many advantages thereof will be apparent from the above detailed description of the same. It will also be apparent that many changes may be made in controlling the chlorination and adjusting the pH values of the chlorinated starch products to produce the desired product fluidity of the chlorinated starch and that many changes may be made in the formulae and process of making the gum confection to accomplish the principles of the invention described in the specification and as set forth in the following claims.

I claim:

1. A gum confection comprising a composition of sugars and a starch reaction product, the starch reaction product consisting of a chlorinated starch material characterized by having chlorine reacted with the starch material, the product being a reaction product of the starch and an alkali hypochlorite containing excess alkali, the said starch reaction product imparting to the gum confection the following improved properties when compared to gum confections employing thin or thick cooking starches: longer shelf life, greater jelling characteristic, increased transparency, and quicker drying characteristic.

2. A gum confection comprising a composition of sugars and a starch reaction product, the starch reaction product consisting of a chlorinated starch material characterized by having chlorine reacted with the starch material, the product being a reaction product of starch and sodium hypochlorite containing excess alkali, and having a fluidity generally in the range of 60, the said starch reaction product imparting to the gum confection the following improved properties when compared to gum confections employing thin or thick cooking starches: longer shelf life, greater jelling characteristic, increased transparency, and quicker drying characteristic.

3. A gum confection comprising a composition of sugars and a starch reaction product, the starch reaction product consisting of a chlorinated starch material characterized by having chlorine reacted with the starch material, the product being a reaction product of the starch and an alkali hypochlorite containing excess alkali, the reacted chlorine being from 0.5% to 1.5% on the dry basis weight of the starch material, the said starch reaction product imparting to the gum confection the following improved properties when compared to gum confections employing thin or thick cooking starches: longer shelf life, greater jelling characteristic, increased transparency, and quicker drying characteristic.

4. A gum confection comprising a composition of sugars and a starch reaction product, the said product being a reaction product of starch and sodium hypochlorite containing excess alkali and consisting of a chlorinated starch material characterized by having chlorine reacted with the starch material in a proportion between 0.5% to 1.5% on the dry basis weight of the starch material and having a pH value to yield a product fluidity in the range between 55 to 65, the said starch reaction product imparting to the gum confection the following improved properties when compared to gum confections employing thin or thick cooking starches: longer shelf life, greater jelling characteristic, increased transparency, and quicker drying characteristic.

ARTHUR D. FULLER.